United States Patent Office 2,876,219
Patented Mar. 3, 1959

2,876,219

6-FLUORO-9α-HALO-11-OXYGENATED-4-PREGNENES AND 6-FLUORO-9α-HALO-11-OXYGENATED-1,4-PREGNADIENES

J Allan Campbell, Kalamazoo Township, Kalamazoo County, John C. Babcock, Portage Township, Kalamazoo County, and John A. Hogg, Kalamazoo Township, Kalamazoo County, Mich., assignors to The Upjohn Company, Kalamazoo, Mich., a corporation of Michigan No Drawing. Application June 9, 1958
Serial No. 740,591

31 Claims. (Cl. 260—239.55)

This invention relates to novel 6α-fluoro- and 6β-fluoro steroid compounds and is more particularly concerned with certain 6-fluoro-9α-halo-11-oxygenated-21-hydroxy-4-pregnene-3,20-diones and the 21-acylates thereof and the $\Delta^1$-analogues of such compounds, for example, 6-fluoro-9α-halo-11β,21-dihydroxy-4-pregnene-3,20-diones and the 21-acylates thereof, 6-fluoro-9α-halo-21-hydroxy-4-pregnene-3,11,20-triones and the 21-acylates thereof, 6-fluoro-9α-halo-11β,21-dihydroxy-1,4-pregnadiene-3,20-diones and the 21-acylates thereof, 6-fluoro-9α-halo-21-hydroxy-1,4-pregnadiene-3,11,20-triones and the 21-acylates thereof and novel 6-fluoro steroid intermediates and methods used in the production thereof.

The novel products of this invention include those represented by the formula:

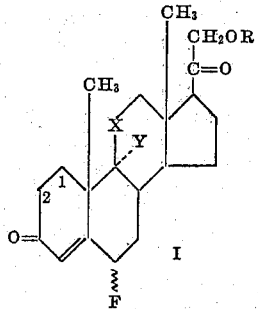

wherein the 1,2-carbon atom linkage is selected from the linkages consisting of single bond and double bond linkages, R represents hydrogen or the acyl radical of an organic carboxylic acid, preferably a hydrocarbon carboxylic acid containing from one to twelve carbon atoms, inclusive, X is selected from the group consisting of the carbonyl radical (>C=O) and the hydroxymethylene radical (>CHOH) and Y is a halogen having an atomic weight of from nineteen to eighty, inclusive.

In this application the wavy line ($\xi$) appearing at the 6-position is a generic expression including the alpha (α) and beta (β) configuration.

The compounds of Formula I possess useful therapeutic properties. They possess glucocorticoid activity and antiphlogistic activity, being useful in the treatment of inflammatory diseases, e. g., rheumatoid arthritis. In addition to anti-inflammatory activity they produce a favorable body electrolyte balance which makes them especially valuable for oral and parenteral as well as topical use. They are useful in the treatment of inflammatory conditions of the skin, eyes and ears of humans and of valuable domestic animals, as well as contact dermatitis and other allergic reactions. Compositions containing the compounds of the present invention can be prepared for human or animal use by incorporating them in any one of the several dosage forms suitable for such use. Administration of the novel steroids thus can be in conventional dosage forms, such as pills, tablets, capsules, solutions, syrups or elixirs for oral use, or in liquid forms which are adaptable to the natural and synthetic cortical steroid hormones for injectable products.

The novel compounds of Formula I can also be administered topically in the form of ointments, creams, lotions, and the like, with or without coacting antibiotics, germicides, or other materials forming advantageous combinations therewith.

The starting compounds for the processes of the present invention, for example, 6α-fluoro-11β,21-dihydroxy-4-pregnene-3,20-dione and the 21-acylates thereof, 6β-fluoro-11β,21-dihydroxy-4-pregnene-3,20-dione and the 21-acylates thereof, are disclosed in our copending application Serial No. 699,507, filed November 29, 1957, now Patent No. 2,838,540, issued June 10, 1958.

The novel compounds of the present invention can be prepared in accordance with the following reaction scheme:

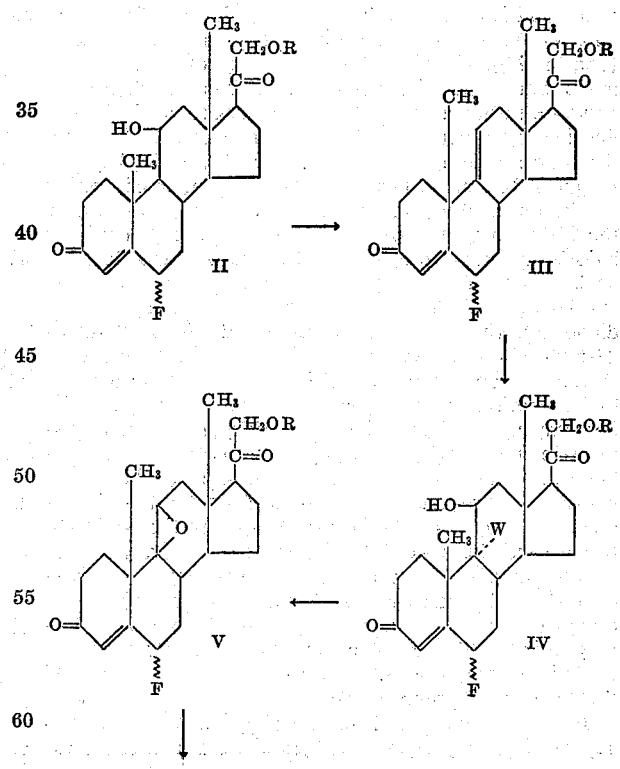

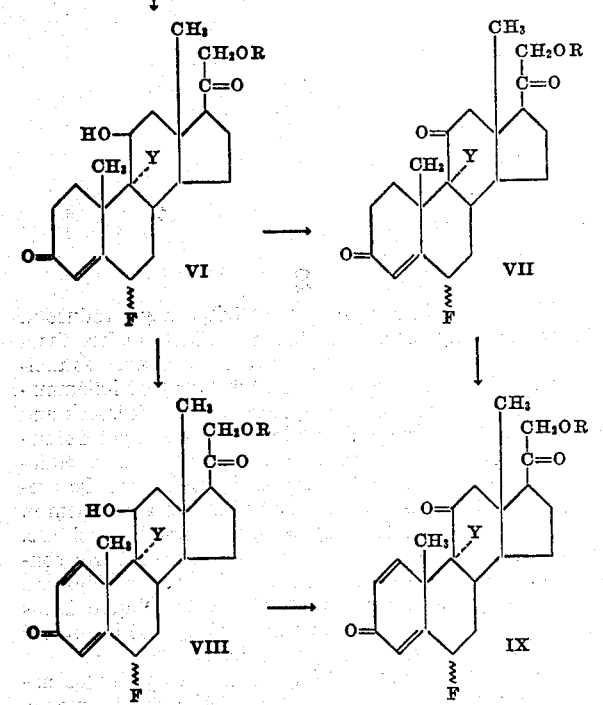

wherein R and Y have the same meaning as previously given and W is a halogen having an atomic weight of from 35 to 127 inclusive.

One of the novel processes of this invention, depicted schematically above, comprises first the dehydration of 6-fluoro-11β,21-dihydroxy-4-pregnene-3,20-dione (and the 21-acylates thereof) to obtain 6-fluoro-21-hydroxy-4,9(11)-pregnadiene-3,20-dione (and the 21-acylates thereof), followed by treatment of the dehydration product with a source of hypohalous acid in which the halogen is bromine, chlorine, or iodine to produce the corresponding 6-fluoro-9α-halo-11β,21-dihydroxy-4-pregnene-3,20-dione (and the 21-acylates thereof). The said 9α-halo compound is then epoxidized with a mild base to give 6-fluoro-9β,11β-oxido-21-hydroxy-4-pregnene - 3,20 - dione (and the 21-acylates thereof). Cleavage of the said 9,11-oxido compound with a hydrogen halide or a hydrogen halide-releasing agent providing a source of hydrogen fluoride, hydrogen chloride, or hydrogen bromide, gives the corresponding 6-fluoro-9α-halo-11β,21-dihydroxy-4-pregnene-3,20-dione (and the 21-acylates thereof) which can be oxidized, by known methods for the oxidation of the 11-hydroxy to 11-keto group, to produce 6-fluoro-9α-halo-21-hydroxy-4-pregnene-3,11,20-trione (and the 21-acylates thereof).

6 - fluoro-9α-halo-11β,21-dihydroxy-4-pregnene - 3,20-dione (and the 21-acylates thereof) and 6-fluoro-9α-halo-21-hydroxy-4-pregnene-3,11,20-trione (and the 21-acylates thereof) can then be subjected to biological dehydrogenation using microorganisms, for example, Septomyxa, or to chemical dehydrogenation using selenium dioxide, to produce the corresponding Δ¹-analogues thereof, namely, 6-fluoro-9α-halo-11β,21-dihydroxy-1,4-pregnadiene-3,20-dione (and the 21-acylates thereof) and 6-fluoro-9α-halo-1,4-pregnadiene-3,11,20-trione (and the 21-acylates thereof), respectively.

Alternatively, 6-fluoro-9α-halo-21-hydroxy-1,4-pregnadiene-3,11,20-trione (and the 21-acylates thereof) can be obtained from 6-fluoro-9α-halo-11β,21-dihydroxy-1,4-pregnadiene-3,20-dione (and the 21-acylates thereof) by oxidation using known methods for the oxidation of the 11-hydroxy group to the 11-keto group.

Treatment of the 21-acylates of 6-fluoro-9α-halo-11β,21-dihydroxy-4-pregnene-3,20-dione and 6-fluoro-9α-halo-21-hydroxy-4-pregnene-3,11,20-trione with microorganisms to effect dehydrogenation at the Δ¹-position also generally effects removal of the 21-acylate group producing a reaction mixture which contains primarily the corresponding Δ¹-21-hydroxy steroid. The Δ¹-21-hydroxy steroid thus obtained can be esterified in accordance with procedures known in the art and discussed in greater detail below.

When chemical dehydrogenation using selenium dioxide is the method used to introduce the Δ¹-bond, the 21-acylates of 6-fluoro-9α-halo-11β,21-dihydroxy-4-pregnene-3,20-dione and 6-fluoro-9α-halo-21-hydroxy-4-pregnene-3,11,20-trione are the preferred steroids used in the reaction, yielding the corresponding Δ¹-21-acylate compounds directly.

In carrying out one of the novel processes of this invention, 6-fluoro-11β,21-dihydroxy-4-pregnene-3,20-dione (and the 21-acylates thereof) (II), is dehydrated to 6-fluoro-21-hydroxy-4,9(11)-pregnadiene-3,20-dione (and the 21-acylates thereof) (III) by methods known in the art, e. g., by a dehydrating agent such as phosphorus oxychloride, thionyl chloride, hydrochloric acid or sulfuric acid and acetic acid. The dehydration is generally effected by the preferred method of reacting the 6-fluoro-11β,21-dihydroxy-4-pregnene-3,20-dione 21-acylates (II) with a carboxylic acid N-haloamide or N-haloimide, wherein the halogen is bromine or chlorine, in an organic base either with or followed by anhydrous sulfur dioxide. Examples of such N-haloamides or N-haloimides are N-chloroacetamide, N-bromoacetamide, N-chlorosuccinimide, N-bromosuccinimide, 3-bromo-5,5-dimethylhydantoin, 1,3-dibromo-5,5-dimethylhydantoin, and the like, N-bromoacetamide being preferred. The organic bases employed as solvents in the above reaction are generally tertiary amines wherein the amino nitrogen is a member of an aromatic ring, such as the pyridines and lower fatty amides, pyridine being preferred. Normally an amount in excess of a molar equivalent of organic base calculated on the basis of the quantity of starting steroid is employed. The sulfur dioxide is advantageously employed in substantially anhydrous form, inasmuch as the presence of water tends to decrease the yield of dehydrated product. The temperature of the reaction is generally between minus forty and plus seventy degrees centigrade, the lower limit being determined by the solubility of the substituents in the solvent selected and the upper limit by the amount of side reaction which normally accompanies reactions involving halogen compounds at higher temperatures. Ordinarily, room temperatures are preferred for convenience and because of the consistently high yields of end product which are obtained. A reaction time between about five minutes and three hours is usually employed, the specific temperature at which the reaction is conducted being determinative of the reaction time. 6-fluoro-21-hydroxy-4,9(11)-pregnadiene-3,20-dione is obtained by the hydrolysis of 6-fluoro-21-hydroxy-4,9(11)-pregnadiene-3,20-dione 21-acylates according to procedures well known in the art.

The thus-obtained dehydration product is converted to 6 - fluoro - 9α - halo - 11β,21 - dihydroxy - 4 - pregnene-3,20-dione (and the 21-acylates thereof) (IV) by reaction with a hypohalous acid. The hypohalous acid is usually produced in situ by reaction of an acid with N-haloamide or N-haloimide wherein the halogen is bromine, chlorine or iodine. The 6-fluoro-21-hydroxy-4,9(11)-pregnadiene-3,20-dione (and the 21-acylates thereof) (III) is dissolved in an organic solvent such as methylene chloride, tertiary butyl alcohol, dioxane, tertiary amyl alcohol, or the like, and reacted at room temperature with the hypohalous acid releasing agent, which includes N-bromoacetamide, N-chloroacetamide, N-bromosuccinimide, N-iodosuccinimide, N-chlorosuccinimide, and the like, in the presence of an acid such as perchloric acid, dilute sulfuric acid, and the like. N-bromoacetamide in tertiary butyl alcohol with perchloric acid and water are the preferred reagents for this reaction. Normally the halogenation is conducted at room temperatures, between fifteen and thirty degrees centigrade, although temperatures on either side of this range are operative. The reaction period may vary from about five minutes to one hour. At the conclusion of the desired reaction, the excess hypohalous acid is destroyed by the addition of sulfites or hydrosulfites, sodium sulfite being normally employed. The resulting 6-fluoro-9α - halo - 11β,21 - dihydroxy - 4 - pregnene - 3,20-dione (and the 21-acylates thereof) (IV), in which the halogen is bromine, chlorine, or iodine, can be isolated from the reaction mixture by adding an excess of water and extracting the product with organic solvents or by recovering the precipitated compound by filtration. The crude reaction product may be employed directly in the next step of the process.

The 9α-halo compound (IV) as defined above is then dehydrohalogenated with a weak base, potassium acetate being preferred. The reaction is conducted in an inert solvent such as methanol, ethanol, acetone, dioxane, and the like. The dehydrohalogenation reaction takes place over a rather wide range of temperatures, normally from about minus fifteen degrees to the boiling point of the reaction mixture, the range between zero degrees and sixty degrees centigrade being most convenient. The reaction time may be varied considerably, depending on the temperature employed, a period of reflux of from about eight to twenty hours producing satisfactory yields, with about eighteen hours usually being sufficient. The reaction mixture is concentrated, cooled and precipitated with water to give 6 - fluoro - 9β,11β - oxido - 21 - hydroxy-4-pregnene-3,20-dione (and the 21-acylates thereof) (V).

In the epoxide opening step, the 9,11-oxido compound (V) is reacted with a hydrogen halide such as hydrogen fluoride, hydrogen chloride or hydrogen bromide, hydrogen fluoride being preferred, to produce the corresponding 6-fluoro-9α-halo-11β-hydroxy-4-pregnene-3,20-dione (VI). Advantageously, the steroid is first dissolved in an organic solvent such as tetrahydrofuran, methylene chloride, and the like. The epoxide cleavage with hydrogen halide is usually conducted at temperatures between about minus eighty and plus fifty degrees centigrade, the preferred limits being between about minus ten and plus 25 degrees centigrade. The reaction time is usually from about one to 24 hours, with one to five hours being required at room temperatures. After the reaction is complete, the mixture is poured into water and neutralized with a dilute base, such as dilute sodium or potassium hydroxide, or a bicarbonate such as sodium bicarbonate, potassium bicarbonate, or the like. The reaction mixture is then extracted in the usual manner, such as with methylene chloride, and the 6 - fluoro - 9α - halo - 11β,21 - dihydroxy - 4 - pregnene-3,20-dione (and the 21-acylates thereof) (VI) recovered in a purified form by recrystallization or chromatography.

6 - fluoro - 9α - halo - 11β,21 - dihydroxy - 4 - pregnene-3,20-dione 21-acylates (VI) can then be treated with an oxidizing agent, for example, chromium trioxide, potassium dichromate or sodium dichromate, to obtain 6 - fluoro - 9α - halo - 21 - hydroxy - 4 - pregnene - 3,11,20-trione 21-acylate (VII). The oxidation can be carried out by a variety of methods, such as, for example, by oxidizing the 6-fluoro-9α-halo-11β,21-dihydroxy-4-pregnene-3,20-dione 21-acylates (VI) in acetic acid solution with chromium trioxide or sodium dichromate, or by oxidizing with chromium trioxide in the presence of pyridine. At the conclusion of the desired oxidation reaction, the excess chromic acid is generally destroyed by the addition of methyl alcohol, ethyl alcohol, and the like. Thereafter, the resulting 6-fluoro-9α-halo-21-hydroxy-4-pregnene-3,11,20-trione 21-acylates (VII) are recovered by conventional means, for example, by precipitation with water, or extraction with water immiscible solvents, e. g., methylene chloride, ether, benzene, toluene, or the like, and purified by crystallization or chromatography. 6 - fluoro - 9α - halo - 21 - hydroxy-4-pregnene-3,11,20-trione is obtained by the hydrolysis of 6 - fluoro - 9α - halo - 21 - hydroxy - 4 - pregnene-3,11,20-trione 21-acylates according to procedures well known in the art for the saponification of hydrocortisone 21-acetate.

6 -fluoro - 9α - halo - 11β,21 - dihydroxy - 4 - pregnene-3,20 dione (and the 21-acylates thereof) (VI) and 6 - fluoro - 9α - halo - 21 - hydroxy - 4 - pregnene - 3,11,20-trione (and the 21-acylates thereof) (VII) are converted to the Δ¹-analogues thereof, 6-fluoro-9α-halo-11β,21 - dihydroxy - 1,4 - pregnadiene - 3,20 - dione (and the 21-acylates thereof) (VIII) and 6-fluoro-9α-halo-21-hydroxy-1,4-pregnadiene-3,11,20-trione (and the 21-acylates thereof) (IX), respectively, using either fermentative or chemical dehydrogenation. Microorganisms such as Septomyxa, Corynebacterium, Fusarium, and the like, are used under fermentation conditions well known in the art (e. g., U. S. 2,602,769) and illustrated in greater detail below. Where Septomyxa is used to effect the dehydrogenation of the compounds of Formula VI it is found to be advantageous to use with the substrate and medium a steroid promoter, such as progesterone, 3-ketobisnor-4-cholen-22-al, 3-ketobisnorcholenic acid, 11β,21-dihydroxy-1,4,17(20)-pregnatriene-3-one, and the like. When the 21-acylates of 6-fluoro-9α-halo-11β,21-dihydroxy-4-pregnene-3,20-dione or 6α-fluoro-9α-halo-21-hydroxy-4-pregnene-3,11,20-trione are subjected to fermentative dehydrogenation to introduce the Δ¹-bond, removal of the 21-acylate group is generally effected. The Δ¹-21-hydroxy steroid can then be subjected to esterification to produce the desired final 21-acylate using conventional 21-acylating conditions. Suitable acylating agents are organic carboxylic acids, particularly hydrocarbon carboxylic acids containing from one to twelve carbon atoms, inclusive, or the acid anhydrides and acid halides thereof. For example, a saturated straight-chain aliphatic acid, e. g., formic, acetic, propionic, butyric, valeric, hexanoic, lauric, a saturated branched-chain aliphatic acid, e. g., trimethylacetic, isobutyric, isovaleric, tertiary butylacetic, a cycloaliphatic saturated acid, e. g., β - cyclopentylpropionic, cyclohexane - carboxylic, cyclohexylacetic, an alkaryl acid, e. g., benzoic, phenylacetic, β-phenylpropionic, o-, m-, and p-toluic, a saturated dibasic acid (which can be converted into water-soluble, e. g., sodium, salts), e. g., succinic, adipic; a monobasic unsaturated acid, e. g., acrylic, crotonic, undecylenic, propiolic, undecolic, cinnamic; dibasic unsaturated acids (which can be converted into water-soluble, e. g., sodium, salts), e. g., maleic and citraconic, or the acid anhydrides and acid halides thereof, can be used to convert 6 - fluoro - 9α - halo - 11β,21 - dihydroxy - 1,4 - pregnadiene - 3,20 - dione and 6 - fluoro - 9α - halo - 21-hydroxy-1,4-pregnadiene-3,11,20-trione to their corresponding 21-acylates. If the acylating agent is the free acid, the reaction is preferably effected in the presence of an esterification catalyst, for example, p-toluenesulfonyl chloride, trifluoroacetic anhydride, p-toluenesulfonic acid, trifluoroacetic acid, sulfuric acid, and the like.

The chemical dehydrogenation can be carried out with selenium dioxide using procedures well known in the art and further illustrated by the examples herein, the 21-acylates being the preferred steroids used in the reaction.

Alternatively, the 6 - fluoro - 9α - halo - 21 - hydroxy-1,4-pregnadiene-3,11,20-trione 21-acylates (IX) are obtained by the oxidation of 6-fluoro-9α-halo-11β,21-dihydroxy-1,4-pregnadiene-3,20-dione 21-acylates (VIII), using the same procedures, described above and in greater detail below, for the oxidation of 6-fluoro-9α-halo-11β,21-dihydroxy-4-pregnene-3,20-dione 21-acylates (VI) to 6 - fluoro - 9α - halo - 21 - hydroxy - 4 - pregnene - 3,11,20-trione 21-acylates (VII). If desired, the 6-fluoro-9α- halo-21-hydroxy-1,4-pregnadiene-3,11,20-trione 21-acylates can be hydrolyzed using procedures well known in the art to obtain 6-fluoro-9α-halo-21-hydroxy-1,4-pregnadiene-3,11,20-trione.

The $\Delta^{1,4}$-compounds of this invention are represented by the following formula:

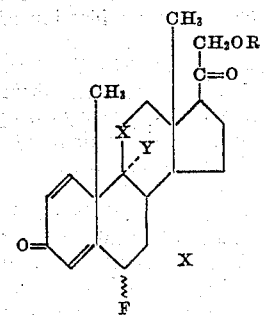

wherein R, X and Y have the same meaning as previously given. An alternative process for the preparation of these compounds is represented by the following reaction scheme:

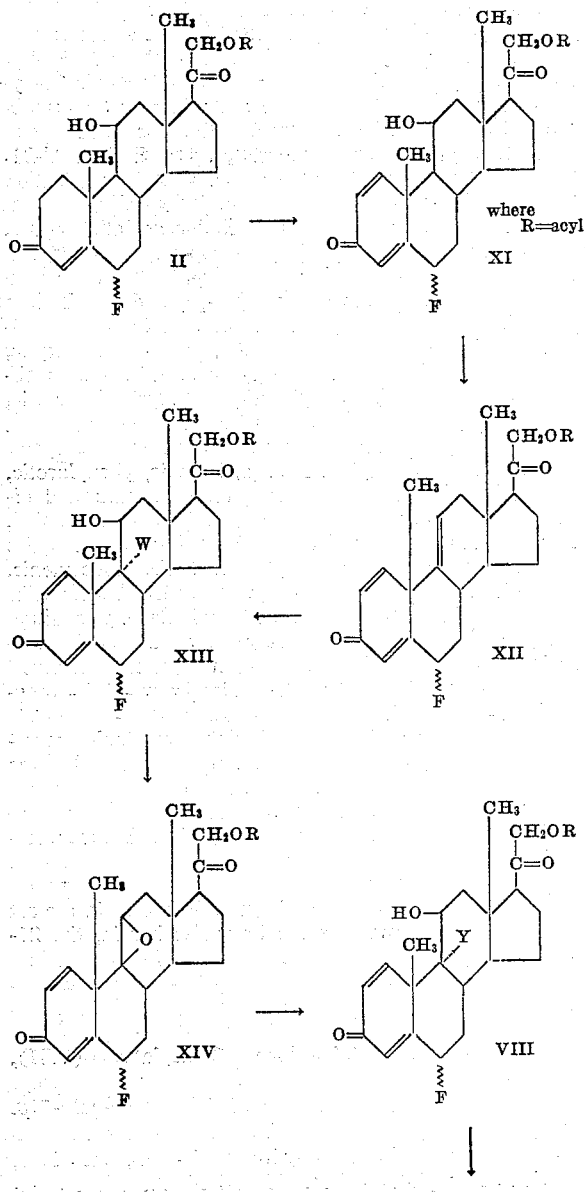

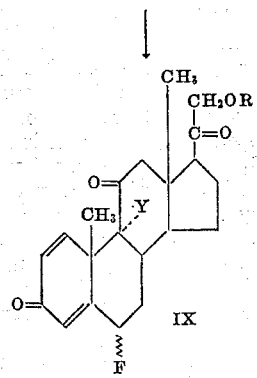

wherein R, W and Y have the same meaning as previously given.

The alternative process for the preparation of the $\Delta^{1,4}$-steroid compounds of the instant invention comprises: the dehydrogenation of 6-fluoro-11β,21-dihydroxy-4-pregnene-3,20-dione (and the 21-acylates thereof) (II) to produce 6-fluoro-11β-hydroxy-1,4-pregnadiene-3,20-dione (and the 21-acylates thereof) (XI) following the procedures used to convert the 9α-halo-11β,21-dihydroxy steroid (and the 21-acylates thereof) (VI) to the $\Delta^{1,4}$-9α-halo-11β,21-dihydroxy steroid (and the 21-acylates thereof) (VIII). The thus-obtained $\Delta^{1,4}$-11β,21-dihydroxy steroid (and the 21-acylates thereof) (XI) is then dehydrated to yield 6-fluoro-21-hydroxy-1,4,9(11)-pregnatriene-3,20-dione (and the 21-acylates thereof) (XII) in the same manner that is used to dehydrate the 11β,21-dihydroxy steroid starting compound (and the 21-acylates thereof) (II) to the $\Delta^{9(11)}$-21-hydroxy steroid (and the 21-acylates thereof) (III). The thus-obtained $\Delta^{1,4,9(11)}$-21-hydroxy steroid (and the 21-acylates thereof) (XII) is then treated with a source of hypohalous acid to convert it to 6-fluoro-9α-halo-11β,21-dihydroxy-1,4-pregnadiene-3,20-dione (and the 21-acylates thereof) (XIII) in the same manner that is used to convert the $\Delta^{9(11)}$-21-hydroxy steroid (and the 21-acylates thereof) (III) to the 9α-halo-11β,21-dihydroxy steroid (and the 21-acylates thereof) (IV). The thus-obtained $\Delta^{1,4}$-9α-halo-11β,21-dihydroxy steroid (and the 21-acylates thereof) (XIII) is then dehydrohalogenated to convert it to 6-fluoro-9β,11β-oxido-21-hydroxy-1,4-pregnadiene-3,20-dione (and the 21-acylates thereof) (XIV) in the same manner that is used to convert the 9α-halo-11β,21-dihydroxy steroid (and the 21-acylates thereof) (IV) to the 9β,11β-oxido-21-hydroxy steroid (and the 21-acylates thereof) (V). The thus-obtained $\Delta^{1,4}$-9β,11β-oxido-21-hydroxy steroid (and the 21-acylates thereof) (XIV) is treated with a hydrogen halide to convert it to 6-fluoro-9α-halo-11β,21-dihydroxy-1,4-pregnadiene-3,20-dione (and the 21-acylates thereof) (VIII) in the same manner that is used to convert the 9β,11β-oxido-21-hydroxy steroid (and the 21-acylates thereof) (V) to the $\Delta^4$-9α-halo-11β,21-dihydroxy steroid (and the 21-acylates thereof) (VI). The thus-obtained $\Delta^{1,4}$-9α-halo-11β,21-dihydroxy 21-acylates (VIII) are then oxidized to convert them to 6-fluoro-9α-halo-21-hydroxy-1,4-pregnadiene-3,11,20-trione 21-acylates thereof (IX) in the same manner that is used to convert the 9α-halo-11β,21-dihydroxy 21-acylates (VI) to the 9α-halo-11-keto-21-hydroxy 21-acylates (VII).

The foregoing compounds, I through XIV, are all characterized by the presence of a 6-fluoro substituent. It should be noted that the configuration of the fluorine at the 6-position can be either 6α or 6β. Thus on substituting 6β-fluoro-11,21-dihydroxy-4-pregnene-3,20-dione as the starting steroid and following the procedures hereinbefore described and as exemplified below produces as the final product of each example the corresponding 6β-epimer. Where the 6β-epimer or a mixture predominating therein is employed as the starting material, any subsequent reaction product can be isolated either as the 6β-epimer or as a mixture of 6α- and 6β-epimers from which the components can be separated by chromatography or crystallization. Alternatively, a 6α-epimeric product can be obtained by treatment of the 6β-epimer or mixtures of the 6α- and 6β-epimers at temperatures near zero degrees centigrade, or slightly higher or lower temperatures, in an organic solvent, such as chloroform, methylene chloride, ether, and the like, and in the presence of a prototropic agent (proton-donating reagent) such as alcohols, organic acids, and the like, with a hydrogen halide such as gaseous hydrogen chloride. The mixture should preferably be maintained at temperatures below zero degrees centigrade during the addition of the hydrogen halide. The reaction mixture can then be washed with successive portions of dilute alkali and water, and then dried and evaporated under reduced pressure. The 6α-fluoro products can be recovered from the crude reaction product and purified by recrystallization.

Alternatively, the epimerization of the 6β-fluoro steroids can be accomplished with alkali. Bases, for example, solutions of sodium hydroxide and potassium hydroxide, may be used to treat the 6β-epimer in solution in an organic solvent, such as methanol, to produce the 6α-epimer.

As indicated above and described in greater detail below, the sequence of reactions embodied in the processes characterizing this invention is susceptible of variation, the precise order selected being determined by such factors as economics and convenience.

The following examples are illustrative of the process and products of the present invention, but are not to be construed as limiting. As used in the examples which follow, the Roman numeral following the name of a compound is used to indicate the relation of the compound to the reaction schemes depicted and described above.

EXAMPLE 1

*6α-fluoro-21-hydroxy-4,9(11)-pregnadiene-3,20-dione 21-acetate (III)*

To a solution of one gram of 6α-fluoro-11β,21-dihydroxy-4-pregnene-3,20-dione 21-acetate (II) in ten milliliters of pyridine there is added 0.4 gram of N-bromoacetamide. The mixture is allowed to stand under nitrogen for about twenty minutes, at which time it is cooled to approximately five degrees centigrade. While stirring, anhydrous sulfur dioxide is passed over the surface until the solution gives no color change with acidified starch-iodide paper. The temperature of the reaction mixture is not allowed to go above approximately twenty degrees centigrade during the sulfur dioxide addition. The mixture is then allowed to stand for about five minutes and is poured into 100 milliliters of ice-water, which results in the precipitation of a crude solid. Crystallization from acetone gives 6α-fluoro-21-hydroxy-4,9(11)-pregnadiene-3,20-dione 21-acetate (III), a crystalline solid.

Similarly, the substitution of other 21-acylates of 6α-fluoro-11β,21-dihydroxy-4-pregnene-3,20-dione is productive of the corresponding 21-acylates of 6α-fluoro-21-hydroxy-4,9(11)-pregnadiene-3,20-dione.

EXAMPLE 1A

*6α-fluoro-21-hydroxy-4,9(11)-pregnadiene-3,20-dione*

Nitrogen is bubbled through a solution of 0.33 gram of 6α-fluoro-21-hydroxy-4,9(11)-pregnadiene-3,20-dione 21-acetate in 33 milliliters of methanol for about fifteen minutes. To this is added a solution of 0.33 gram of potassium bicarbonate in four milliliters of water, likewise treated with nitrogen. After stirring under nitrogen for about five hours, the base is neutralized by the addition of 2.5 milliliters of five percent hydrochloric acid. The mixture is then concentrated under reduced pressure at fifty degrees centigrade to about five milliliters. The residue is taken up in ethyl acetate, washed, dried and evaporated to dryness. Crystallization from acetone-Skellysolve B hexanes gives 6α-fluoro-21-hydroxy-4,9(11)-pregnadiene-3,20-dione, a crystalline solid.

In like manner other 21-acylates of 6α-fluoro-21-hydroxy-4,9(11)-pregnadiene-3,20-dione can be converted to 6α-fluoro-21-hydroxy-4,9(11)-pregnadiene-3,20-dione.

EXAMPLE 2

*6α-fluoro-9α-bromo-11β,21-dihydroxy-4-pregnene-3,20-dione 21-acetate (IV)*

To a solution of 420 milligrams of 6α-fluoro-21-hydroxy-4,9(11)-pregnadiene-3,20-dione 21-acetate (III) in 6.5 milliliters of methylene chloride there is added 12.5 milliliters of tertiary butyl alcohol, a solution of one milliliter of 72 percent perchloric acid in 7.5 milliliters of water, and a solution of 182 milligrams of N-bromoacetamide in 3.2 milliliters of tertiary butyl alcohol. After stirring for about fifteen minutes, a solution of 182 milligrams of sodium sulfite in ten milliliters of water is added and the mixture concentrated under reduced pressure at approximately sixty degrees centigrade until crystallization occurs. After cooling in an ice bath, thirty milliliters of water is added with stirring. The crystalline product is filtered, washed with water and dried, yielding crystalline 6α-fluoro-9α-bromo-11β,21-dihydroxy-4-pregnene-3,20-dione 21-acetate (IV). The product was used in the succeeding example without further purification.

Similarly, the substitution of 6α-fluoro-21-hydroxy-4,9(11)-pregnadiene-3,20-dione (and other 21-acylates) is productive of 6α-fluoro-9α-bromo-11β,21-dihydroxy-3,20-dione (and other 21-acylates).

Substitution of another N-haloamide or an N-haloimide such as N-iodosuccinimide or N-chlorosuccinimide for the N-bromoacetamide in the foregoing reaction is productive of the corresponding 9α-halo product.

EXAMPLE 3

*6α-fluoro-9β,11β-oxido-21-hydroxy-4-pregnene-3,20-dione (V)*

A mixture of 2.816 grams of 6α-fluoro-9α-bromo-11β,21-dihydroxy-4-pregnene-3,20-dione (IV), 2.816 grams of potassium acetate, and ninety milliliters of acetone is stirred and heated at about reflux temperature for approximately eighteen hours. The reaction mixture is then concentrated to about one-half the original volume and cooled in an ice bath. Addition of 250 milliliters of water yields 6α-fluoro-9β,11β-oxido-21-hydroxy-4-pregnene-3,20-dione (V), a crystalline solid, which is recovered by filtration.

Similarly, the substitution of the 21-acetate (and other 21-acylates) of 6α-fluoro-9α-bromo-11β,21-dihydroxy-4-pregnene-3,20-dione is productive of the 21-acetate (and other 21-acylates) of 6α-fluoro-9β,11β-oxido-21-hydroxy-4-pregnene-3,20-dione.

In like manner, 6α-fluoro-9α-chloro-11β,21-dihydroxy-4-pregnene-3,20-dione (and the 21-acylates thereof) and the 9α-iodo analogue thereof can be converted to 6α-fluoro-9β,11β-oxido-21-hydroxy-4-pregnene-3,20-dione (and the 21-acylates thereof).

EXAMPLE 4

*6α,9α-difluoro-11β,21-dihydroxy-4-pregnene-3,20-dione (VI)*

To 3.41 grams of liquid hydrogen fluoride and twenty milliliters of methylene chloride cooled in a Dry-Ice bath there is added, portion-wise, a slurry of 1.875 grams of 6α-fluoro-9β,11β-oxido-21-hydroxy-4-pregnene-3,20-dione (V) in 5.97 grams of tetrahydrofuran (distilled over sodium hydroxide) and twenty milliliters of methylene chloride which had similarly been cooled in a Dry-Ice bath. After standing at approximately zero to five degrees centigrade for about seventeen hours, the reaction mixture is poured slowly into a stirred mixture of 300 milliliters of ice-water, fifty milliliters of methylene chloride, and twenty grams of sodium bicarbonate. The mixture is stirred for a few minutes, the methylene chloride layer is separated and the water phase extracted with two 50-milliliter portions of fresh methylene chloride. The combined methylene chloride solutions are washed with water, dried, concentrated to 100 milliliters, and poured onto a chromatographic column containing 100 grams of Florisil (synthetic magnesium silicate). The column is eluted with increasing proportions of acetone in Skellysolve B hexanes (100 milliliter fractions). The crystals obtained in allowing the solvent to evaporate from the twenty to 35 percent acetone fractions are recrystallized from acetone-Skellysolve B hexanes to give substantially pure 6α,9α-difluoro - 11β,21 - dihydroxy - 4-pregnene-3,20-dione, a crystalline solid.

Similarly, the substitution of the 21-acetate (and other 21-acylates) of 6α-fluoro-9β,11β-oxido-21-hydroxy-4-pregnene-3,20-dione is productive of the 21-acetate (and other 21-acylates) of 6α,9α-difluoro-11β,21-dihydroxy-4-pregnene-3,20-dione.

Substitution of aqueous hydrogen chloride or hydrogen bromide for the hydrogen fluoride above is productive of the corresponding 9α-halo product.

EXAMPLE 5

6α,9α - difluoro - 21 - hydroxy - 4 - pregnene-3,11,20-trione 21-acetate (VII)

A solution is prepared containing 0.5 gram of 6α,9α-difluoro - 11β,21 - dihydroxy - 4 - pregnene - 3,20 - dione 21-acetate (VI), 0.15 gram of chromium trioxide, ten milliliters of glacial acetic acid and one-half milliliter of water. This mixture is stirred and maintained at room temperature for approximately eight hours, after which the reaction is terminated by addition of methanol. Thereafter, the mixture is poured into fifty milliliters of ice water and the thus-obtained precipitate collected on a filter and recrystallized three times from ethyl acetate and Skellysolve B hexanes to give crystals of 6α,9α-difluoro-4-pregnene-3,11,20-trione 21-acetate (VII).

Similarly, substitution of other 21-acylates of 6α,9α-difluoro-11β,21-dihydroxy-4-pregnene-3,20-dione is productive of the corresponding 21-acylates of 6α,9α-difluoro-21-hydroxy-4-pregnene-3,11,20-trione. Treating the 21-acylates of 6α,9α-difluoro-21-hydroxy-4-pregnene-3,11,20-trione according to the procedure of Example 1A is productive of 6α,9α-difluoro-21-hydroxy-4-pregnene-3,11,20-trione.

Substitution of the corresponding 9α-chloro and 9α-bromo starting steroid 21-acylate in the above reaction produces 6α - fluoro - 9α - chloro - 4 - pregnene - 3,11,20-trione 21-acylate and its 9α-bromo analogue, respectively, which, if desired, can be hydrolyzed to 6α-fluoro-9α-chloro - 4 - pregnene - 3,11,20 - trione and its 9α - bromo analogue, respectively, by treatment with hydrochloric acid in aqueous methanol.

EXAMPLE 6

6α,9α - difluoro - 11β,21 - dihydroxy - 1,4-pregnadiene-3,20-dione (VIII) (biological dehydrogenation)

Three 100-milliliter portions of a medium, in 250-milliliter Erlenmeyer flasks, containing one percent glucose, two percent corn steep liquor (sixty percent solids) and tap water, are adjusted to a pH of 4.9. This medium is sterilized for 45 minutes at fifteen pounds per square inch pressure and inoculated with a one to two day growth of Septomyxa affinis A. T. C. C. 6737. The Erlenmeyer flasks are shaken at room temperature (about 26 to 28 degrees centigrade) for a period of three days. At the end of this period this 300-milliliter volume is used as an inoculum for five liters of the same glucose-corn steep liquor medium which in addition contained five milliliters of an antifoam compound (a mixture of lard oil and octadecanol). The fermentor is placed into the water-bath, adjusted to 28 degrees centigrade and the contents stirred (300 R. P. M.) and aerated (0.1 liter per minute of air to ten liters of beer). After twenty hours of incubation, when a good growth has been developed one gram of 6α,9α-difluoro-11β,21-dihydroxy-4-pregnene-3,20-dione (VI) plus one-half gram of 3-ketobisnor-4-cholen-22-al, dissolved in sixteen milliliters of dimethylformamide is added and the incubation carried out at the same temperature (28 degrees centigrade) and aeration for a period of 72 hours (final pH 8.3). The mycelium was filtered off and extracted with three 200-milliliter portions of acetone. The beer was extracted with three one-liter portions of methylene chloride and thereupon the extracts of the beer and acetone are combined, dried over anhydrous sodium sulfate, concentrated to 100 milliliters and poured onto a chromatographic column containing 100 grams of Florisil (synthetic magnesium silicate). The column is eluted with increasing proportions of acetone in Skellysolve B hexanes (100 milliliter fractions). The crystals obtained on allowing the solvent to evaporate from the 25 to 35 percent acetone fractions are recrystallized from acetone-Skellysolve B hexanes to give substantially pure 6α,9α - difluoro - 11β,21 - dihydroxy - 1,4 - pregnadiene-3,20-dione, a crystalline solid.

Instead of Septomyxa, species of other genera such as Corynebacterium, Didymella, Calonectria, Alternaria, Colletotrichum, Cylindrocarpon, Ophiobolus, Fusarium, Listeria, Erysipelothrix, Mycobacterium, Trichothecium, Leptosphaeria, Cucurbitaria, Nocardia, and enzymes of fungi of the family Tuberculariaceae can be used to introduce a $\Delta^1$-bond into 6α,9α-difluoro-11β,21-dihydroxy-4-pregnene-3,20-dione.

Similarly, substitution of the corresponding 9α-chloro or 9α-bromo starting steroid in the above reaction produces 6α - fluoro - 9α - chloro - 11β,21 - dihydroxy-1,4 - pregnadiene - 3,20 - dione and its 9α - bromo analogue, respectively.

EXAMPLE 6A

6α,9α - difluoro - 11β,21 - dihydroxy - 1,4 - pregnadiene-3,20-dione 21-acetate (VIII)

Substituting 6α,9α - difluoro - 11β,21 - dihydroxy - 4-pregnene-3,20-dione 21-acetate (and other 21-acylates) for 6α,9α - difluoro - 11β,21 - dihydroxy - 4 - pregnene-3,20-dione in the procedure of Example 6 is productive of 6α,9α - difluoro - 11β,21 - dihydroxy - 1,4-pregnadiene-3,20-dione (VIII).

To 0.30 gram of 6α,9α-difluoro-11β,21-dihydroxy-1,4-pregnadiene-3,20-dione there is added two milliliters of pyridine and 1.5 milliliters of acetic anhydride. The reaction mixture is allowed to stand at approximately 25 degrees centigrade for about eight hours and then poured into forty milliliters of ice-water whereupon a solid precipitates. The thus-obtained mixture is stirred for two hours. The solid product is recovered by filtration, washed with water, dried and recrystallized from etherhexane to give crystals of 6α,9α-difluoro-11β,21-dihydroxy-1,4-pregnadiene-3,20-dione 21-acetate.

Similarly, substitution of the corresponding 9α-chloro or 9α-bromo starting steroid in the above reactions of Example 6A produces 6α-fluoro-9α-chloro-11β,21-dihydroxy-1,4-pregnadiene-3,20-dione 21-acetate and its 9α-bromo analogue, respectively.

EXAMPLE 6B

6α,9α - difluoro - 11β,21 - dihydroxy - 1,4 - pregnadiene-3,20-dione 21-hemisuccinate (VIII)

A solution is prepared containing 0.5 gram of succinic anhydride and 0.1 gram of 6α,9α-difluoro-11β,21-dihydroxy-1,4-pregnadiene-3,20-dione (VIII) in five milliliters of pyridine. The solution is allowed to stand for a period of about twenty hours, diluted with water and the thus-obtained mixture is refrigerated and then filtered. The precipitate is collected on a filter and recrystallized two times from methanol to give 6α,9α-difluoro-11β,21-dihydroxy - 1,4-pregnadiene-3,20-dione 21-hemisuccinate, a crystalline solid.

Similarly, substitution of the corresponding 9α-chloro or 9α-bromo starting steroid in the above reaction of Example 6B produces 6α-fluoro-9α-chloro-11β,21-dihydroxy-1,4-pregnadiene-3,20-dione 21-hemisuccinate and its 9α-bromo analogue, respectively.

Similarly, by reacting 6α,9α-difluoro-11β,21-dihydroxy-1,4-pregnadiene-3,20-dione (or the corresponding 9α-chloro or 9α-bromo analogue thereof) with the appropriate hydrocarbon carboxylic acids, or the acid anhydrides and acid halides thereof, there are produced other 17-acylates of 6α,9α - difluoro-11β,21-dihydroxy-1,4-pregnadiene-3,20-dione (and the corresponding 9α-chloro and 9α-bromo analogue thereof, respectively), such as 6α,9α-difluoro - 11β,21 - dihydroxy-1,4-pregnadiene-3,20-dione 21 - formate, 6α,9α-difluoro-11β,21-dihydroxy-1,4 pregnadiene - 3,20-dione 21-proprionate, 6α,9α - difluoro-11β, 21-dihydroxy-1,4-pregnadiene-3,20-dione 21-butyrate, 6α, 9α - difluoro-11β,21-dihydroxy-1,4-pregnadiene-3,20-dione 21-valerate, 6α,9α-difluoro-11β,21-dihydroxy-1,4-pregnadiene-3,20-dione 21-hexanoate, 6α,9α-difluoro-11β,21-dihydroxy-1,4-pregnadiene-3,20-dione 21-laurate, 6α,9α-difluoro - 11β,21-dihydroxy-1,4-pregnadiene-3,20-dione 21-trimethylacetate, 6α,9α - difluoro-11β,21-dihydroxy-1,4-pregnadiene-3,20-dione 21-isobutyrate, 6α,9α-difluoro-11β, 21 - dihydroxy-1,4-pregnadiene-3,20-dione 21-isovalerate, 6α,9α - difluoro - 11β,21-dihydroxy-1,4-pregnadiene-3,20-dione 21-tertiarybutyl-acetate, 6α,9α-difluoro-11β,21-dihydroxy-1,4-pregnadiene-3,20-dione 21-(β-cyclopentylpropionate), 6α,9α-difluoro-11β,21-dihydroxy-1,4-pregnadiene-3,20 - dione 21-cyclohexane-carboxylate, 6α,9α-difluoro-11β,21 - dihydroxy-1,4-pregnadiene-3,20-dione 21-cyclohexylacetate, 6α,9α-difluoro-11β,21-dihydroxy-1,4-pregnadiene-3,20-dione 21-benzoate, 6α,9α-difluoro-11β,21-dihydroxy - 1,4-pregnadiene-3,20-dione 21-phenylacetate, 6α, 9α - difluoro - 11β,21-dihydroxy-1,4-pregnadiene - 3,20-dione 21-(β-phenylpropionate), 6α,9α-difluoro-11β,21-dihydroxy - 1,4 - pregnadiene-3,20-dione 21-(o-, m-, p-toluate), 6α,9α - difluoro-11β,21-dihydroxy-1,4-pregnadiene-3,20 - dione 21-hemiadipate, 6α,9α-difluoro-11β,21-dihydroxy - 1,4-pregnadiene-3,20-dione 21-acrylate, 6α,9α-difluoro - 11β,21-dihydroxy-1,4-pregnadiene-3,20-dione 21-crotonate, 6α,9α - difluoro-11β,21-dihydroxy-1,4-pregnadiene-3,20-dione 21-undecylenate, 6α,9α-difluoro-11β,21-dihydroxy-1,4-pregnadiene-3,20-dione 21-propiolate, 6α, 9α - difluoro-11β,21-dihydroxy-1,4-pregnadiene-3,20-dione 21 - (2-butynoate), 6α,9α-difluoro-11β,21-dihydroxy-1,4-pregnadiene-3,20-dione 21-undecolate, 6α,9α-difluoro-11β, 21 - dihydroxy-1,4-pregnadiene-3,20-dione 21-cinnamate, 6α,9α - difluoro - 11β,21-dihydroxy-1,4-pregnadiene-3,20-dione 21-maleate, and 6α,9α-difluoro-11β,21-dihydroxy-1,4-pregnadiene-3,20-dione 21-citraconate.

If the corresponding acylating agent is solid an inert solvent such as toluene, xylene, or dioxane can be added to effect solution and provide a liquid esterification medium.

If the esterifying agent is the free acid, the reaction is carried out in the presence of an esterification catalyst.

Following the esterification procedures of Examples 6A and 6B but substituting 6α,9α-difluoro-11β,21-dihydroxy-4-pregnene-3,20-dione (and the corresponding 9α-chloro and 9α-bromo analogue thereof, respectively) for 6α,9α - difluoro - 11β,21-dihydroxy-1,4-pregnadiene-3,20-dione is productive of the 21-acylates of 6α,9α-difluoro-11β,21 - dihydroxy-4-pregnene-3,20-dione (and the corresponding 9α-chloro and 9α-bromo analogue thereof, respectively) such as, for example, the 21-acetate, the 21-propionate, the 21-hemisuccinate, the 21- benzoate and the 21-(β-cyclopentylpropionate).

EXAMPLE 7

6α,9α - difluoro - 11β,21 - dihydroxy - 1,4 - pregnadiene-3,20-dione 21-hemisuccinate sodium salt Sodium hydroxide solution (0.1 Normal) is slowly added to a stirred solution of 100 milligrams of 6α,9α-difluoro - 11β,21 - dihydroxy-1,4-pregnadiene-3,20-dione 21-hemisuccinate, dissolved in two milliliters of acetone until the pH rises to about 7.4. During the addition of the sodium hydroxide solution, five milliliters of water is also added. The solution is then concentrated at about 25 degrees centigrade under vacuum to remove the acetone. The resulting aqueous solution of 6α,9α-difluoro-11β,21-dihydroxy-1,4-pregnadiene-3,20-dione 21-hemisuccinate sodium salt is filtered and freeze-dried to give pure 6α,9α - difluoro - 11β,21-dihydroxy-1,4-pregnadiene-3,20-dione 21-hemisuccinate sodium salt.

Similarly, substitution of the corresponding 9α-chloro or 9α-bromo starting steroid in the above reaction of Example 7 is productive of 6α-fluoro-9α-chloro-11β,21-dihydroxy-1,4-pregnadiene-3,20-dione 21-hemisuccinate sodium salt and its 9α-bromo analogue, respectively.

Substitution of the 21-hemisuccinate of 6α,9α-difluoro-11β,21-dihydroxy-4-pregnene-3,20-dione (or the corresponding 9α-chloro or 9α-bromo analogues thereof) for the 21-hemisuccinate of 6α,9α-difluoro-11β,21-dihydroxy-1,4-pregnadiene-3,20-dione is productive of 6α,9α-difluoro-11β,21-dihydroxy-4-pregnene-3,20-dione 21-hemisuccinate sodium salt (and the corresponding 9α-chloro and 9α-bromo analogue thereof, respectively).

EXAMPLE 8

6α,9α-difluoro-21-hydroxy-1,4-pregnadiene-3,11,20-trione (IX)

Substituting 6α,9α-difluoro-21-hydroxy-4-pregnene-3,11,20-trione (VII) for 6α,9α-difluoro-11β,21-dihydroxy-4-pregnene-3,20-dione (VI) in the procedure of Example 6 is productive of 6α,9α-difluoro-21-hydroxy-1,4-pregnadiene-3,11,20-trione, a crystalline solid.

Likewise, the other microorganisms and enzymes listed in Example 6 can be used to introduce a Δ¹-bond into 6α, 9α-difluoro-21-hydroxy-4-pregnene-3,11,20-trione (IX).

Similarly, substitution of the corresponding 9α-chloro or 9α-bromo starting steroid in the above reaction produces 6α-fluoro-9α-chloro-21-hydroxy-1,4-pregnadiene-3, 20-dione and its 9α-bromo analogue, respectively.

EXAMPLE 8A

6α,9α-difluoro-21-hydroxy-1,4-pregnadiene-3,11,20-trione 21-acetate (IX)

Substituting 6α,9α-difluoro-21-hydroxy-4-pregnene-3,11, 20-trione 21-acetate (or other 21-acylates) for 6α,9α-difluoro-11β-21-dihydroxy-4-pregnene-3,20-dione in the procedure of Example 6 is productive of 6α,9α-difluoro-21-hydroxy-1,4-pregnadiene-3,11,20-trione (IX) which is then esterified according to procedure disclosed in Example 6A to yield 6α,9α-difluoro-21-hydroxy-1,4-pregnadiene-3,20-dione 21-acetate, a crystalline solid.

Similarly, substitution of the corresponding 9α-chloro or 9α-bromo starting steroid produces 6α-fluoro-9α-chloro-21-hydroxy-1,4-pregnadiene-3,20-dione 21-acetate and its 9α-bromo analogue, respectively.

EXAMPLE 8B

6α,9α-difluoro-21-hydroxy-1,4-pregnadiene-3,11,20-trione 21-hemisuccinate (IX)

Substituting 6α,9α-difluoro-21-hydroxy-1,4-pregnadiene-3,11,20-trione (IX) for 6α,9α-difluoro-11β,21-dihydroxy-1,4-pregnadiene-3,20-dione (VIII) in the procedure of Example 6B is productive of 6α,9α-difluoro-21-hydroxy-1,4-pregnadiene-3,11,20-trione 21-hemisuccinate, a crystalline solid.

Similarly, substitution of the corresponding 9α-chloro or 9α-bromo starting steroid in the procedure of Example 6B produces 6α-fluoro-9α-chloro-21-hydroxy-1,4-pregnadiene-3,11,20-trione 21-hemisuccinate and its 9α-bromo analogue, respectively.

Similarly, by reacting 6α,9α-difluoro-21-hydroxy-1,4-pregnadiene-3,11,20-trione (and the corresponding 9α-chloro and 9α-bromo analogue thereof, respectively), with the appropriate hydrocarbon carboxylic acids (in the presence of an esterification catalyst), or the acid anhydrides and acid halides thereof, such as those named above, there are produced other 17-acylates of 6α,9α-difluoro-21-hydroxy-1,4-pregnadiene-3,11,20-trione (and the corresponding 9α-chloro and 9α-bromo analogue thereof, respectively) such as, for example, the 21-acetate, the 21-propionate, the 21-hemisuccinate, the 21-benzoate and the 21-(β-cyclopentylpropionate).

If the corresponding acylating agent is solid, an inert solvent such as toluene, xylene, or dioxane can be added to effect solution and to provide a liquid esterification medium.

If the esterifying agent is the free acid, the reaction is carried out in the presence of an esterification catalyst.

Following the esterification procedures of Examples 6A and 6B but substituting 6α,9α-difluoro-21-hydroxy-4-pregnene-3,11,20-trione (and the corresponding 9α-chloro or 9α-bromo analogue thereof, respectively) for 6α,9α-difluoro-11β,21-dihydroxy-1,4-pregnadiene-3,20 - dione is productive of the 21-acylates of 6α,9α-difluoro-21-hydroxy-4-pregnene-3,11,20-trione (and the corresponding 9α-chloro or 9α-bromo analogue thereof, respectively) such as, for example, the 21-acetate, the 21-propionate, the 21-hemisuccinate, the 21-benzoate and the 21-(β-cyclopentylpropionate).

Example 9

*6α,9α-difluoro-21-hydroxy-1,4-pregnadiene-3,11,20-trione 21-hemisuccinate sodium salt*

Substituting 6α,9α-difluoro-21-hydroxy-1,4-pregnadiene-3,11,20-trione 21-hemisuccinate (or the corresponding 9α-chloro or 9α-bromo analogues thereof) for 6α,9α-difluoro-11β,21-dihydroxy-1,4-pregnadiene-3,20 - dione 21-hemisuccinate in the procedure of Example 7 is productive of crystals of 6α,9α-difluoro-21-hydroxy-1,4-pregnadiene-3,11,20-trione 21-hemisuccinate sodium salt (and the corresponding 9α-chloro or 9α-bromo analogue thereof, respectively).

Substitution of the 21-hemisuccinate of 6α,9α-difluoro-21-hydroxy-4-pregnene-3,11,20-trione 21 - hemisuccinate (and the corresponding 9α-chloro or 9α-bromo analogue thereof, respectively) for the 21-hemisuccinate of 6α,9α-difluoro-11β,21-dihydroxy-1,4-pregnadiene-3,20 - dione in the procedure of Example 7 is productive of 6α,9α-difluoro-21-hydroxy-4-pregnene-3,20-dione 21 - hemisuccinate sodium salt (and the corresponding 9α-chloro or 9α-bromo analogue thereof respectively).

Example 10

*6α,9α-difluoro-21-hydroxy-1,4-pregnadiene-3,11,20 - trione (and the 21-acylates thereof) (IX) from 6α,9α-difluoro-11β,21-dihydroxy-1,4-pregnadiene-3,20-dione (and the 21-acylates thereof) (VIII)*

Substituting 6α,9α-difluoro-11β,21-dihydroxy-1,4-pregnadiene-3,20-dione 21-acetate (and other 21-acylates thereof) (VIII) for 6α,9α-difluoro-11β,21-dihydroxy-4-pregnene-3,20-dione 21-acetate (and other 21-acylates thereof) (VI) in the procedure of Example 5 produces 6α,9α-difluoro-21-hydroxy-1,4-pregnadiene-3,11,20 - trione 21-acetate (and other 21-acylates thereof) (IX), which can be hydrolyzed to 6α,9α-difluoro-21-hydroxy-1,4-pregnadiene-3,11,20-trione according to the procedure of Example 1A.

Similarly, substitution of the corresponding 9α-chloro of 9α-bromo starting steroid 21-acylates in the reaction of Example 5 produces 6α-fluoro-9α-chloro-21-hydroxy-1,4-pregnadiene-3,11,20-trione 21-acylates and its 9α-bromo analogue 21-acylates, respectively, which can be hydrolyzed to 6α-fluoro-9α-chloro-21-hydroxy-1,4-pregnadiene-3,11,20-trione or its 9α-bromo analogue by treatment with hydrochloric acid in aqueous methanol.

Example 11

*6α,9α-difluoro-11β,21-dihydroxy-1,4 - pregnadiene - 3,20-dione acetate (VIII) (Chemical Dehydrogenation)*

A mixture of 100 milligrams of 6α,9α-difluoro-11β,21-dihydroxy-4-pregnene-3,20-dione acetate dissolved in six milliliters of tertiary butyl alcohol and 0.55 milliliter of acetic acid is heated together with thirty milligrams of selenium dioxide to approximately 75 degrees centigrade under stirring for a period of about 24 hours. Thereafter another 30-milligram portion of selenium dioxide is added and the mixture is heated to about 75 degrees centigrade under continuous stirring for a further period of 24 hours. The mixture is then cooled, filtered to remove the selenium dioxide and evaporated. The residue is recrystallized from acetone Skellysolve B hexanes four times to give 6α,9α - difluoro-11β,21-dihydroxy-1,4-pregnadiene-3,20-dione acetate.

In like manner, substituting 6α,9α-difluoro-11β,21-dihydroxy-4-pregnene-3,20-dione (and other 21-acylates thereof) in the above reaction is productive of the 6α,9α-difluoro-11β,21 - dihydroxy - 1,4 - pregnadiene -3,20-dione (and other 21-acylates thereof).

Similarly, substitution of the corresponding 9α-chloro or 9α-bromo starting steroids in the above reaction produces 6α-fluoro-9α-chloro-11β,21-dihydroxy-1,4-pregnadiene-3,20-dione acetate (and other 21-acylates), 6α-fluoro-9α-chloro-11β,21-dihydroxy - 1,4-pregnadiene-3,20-dione and their 9α-bromo analogues, respectively.

Example 12

*6α,9α-difluoro-21-hydroxy-1,4-pregnadiene-3,11,20-trione (IX) (Chemical Dehydrogenation)*

Substituting 6α,9α - difluoro-21 - hydroxy-4 - pregnene-3,11,20 - trione acetate for 6α,9α - difluoro-11β,21 - dihydroxy-4-pregnene-3,20-dione acetate in the procedure of Example 11 is productive of 6α,9α-difluoro-21-hydroxy-1,4-pregnadiene-3,11,20-trione acetate.

In like manner, substituting 6α,9α-difluoro-21-hydroxy-4-pregnene-3,11,20-trione (and the 21-acylates thereof) in the above reaction is productive of 6α,9α-difluoro-21-hydroxy-1,4-pregnadiene-3,11,20-trione (and the 21-acylates thereof).

Similarly, substitution of the corresponding 9α-chloro or 9α-bromo starting steroid in the procedure of Example 11 produces 6α-fluoro-9α-chloro-21-hydroxy-1,4-pregnadiene-3,11,20-trione acetate (and other 21-acylates), 6α-fluoro-9α-chloro - 21-hydroxy-1,4 - pregnadiene - 3,11,20-trione and their 9α-bromo analogues, respectively.

Example 13

*6α-fluoro-11β,21-dihydroxy-1,4-pregnadiene-3,20-dione (XI) (Biological Dehydrogenation)*

Substituting 6α-fluoro - 11β,21-dihydroxy - 4-pregnene-3,20-dione (II) for 6α,9α-difluoro-11β,21-dihydroxy-4-pregnene-3,20-dione (VI) in the procedure of Example 6 produces 6α-fluoro-11β,21-dihydroxy-1,4-pregnadiene-3,20-dione (XI), a crystalline solid.

Example 13A

*6α-fluoro-11β,21-dihydroxy-1,4-pregnadiene-3,20-dione 21-acetate (XI)*

Substituting 6α-fluoro-11β,21 - dihydroxy - 4 - pregnene-3,20-dione 21-acetate (or other 21-acylates) in the procedure of Example 6 is productive of 6α-fluoro-11β,21-dihydroxy-1,4-pregnadiene-3,20-dione (XI).

Substituting 6α-fluoro - 11β,21 - dihydroxy-1,4 - pregnadiene-3,20-dione (XI) for 6α,9α-difluoro-11β,21-dihydroxy-1,4-pregnadiene-3,20-dione (VIII) in the esterification procedure of Example 6A is productive of 6α-fluoro-11β,21-dihydroxy-1,4-pregnadiene-3,20-dione 21-acetate, a crystalline solid.

Example 13B

6α-fluoro-11β,21-dihydroxy-1,4-pregnadiene-3,20-dione 21-hemisuccinate (XI)

Substituting 6α-fluoro-11β,21-dihydroxy-1,4-pregnadiene-3,20-dione for 6α,9α-difluoro-11β,21-dihydroxy-1,4-pregnadiene-3,20-dione in the procedure of Example 6B is productive of 6α-fluoro-11β,21-dihydroxy-1,4-pregnadiene-3,20-dione 21-hemisuccinate, a crystalline solid.

Similarly, by reacting 6α-fluoro-11β,21-dihydroxy-1,4-pregnadiene-3,20-dione with the appropriate hydrocarbon carboxylic acids (in the presence of an esterification catalyst), or the acid anhydrides and acid halides thereof, such as those named above, there are produced other 21-acylates of 6α-fluoro-11β,21-dihydroxy-1,4-pregnadiene-3,20-dione, such as, for example, the 21-propionate, the 21-(β-cyclopentylpropionate), and the 21-benzoate.

Example 14

6α-fluoro-11β,21-dihydroxy-1,4-pregnadiene-3,20-dione acetate (XI) (Chemical Dehydrogenation)

Substituting 6α-fluoro-11β,21-dihydroxy-4-pregnene-3,20-dione acetate for 6α,9α-difluoro-11β,21-dihydroxy-4-pregnene-3,20-dione acetate in the procedure of Example 11 produces 6α-fluoro-11β,21-dihydroxy-1,4-pregnadiene-3,20-dione acetate, a crystalline solid.

In like manner, substituting 6α-fluoro-11β,21-dihydroxy-4-pregnene-3,20-dione (and the 21-acylates thereof) in the procedure of Example 11 is productive of 6α-fluoro-11β,21-dihydroxy-1,4-pregnadiene-3,20-dione (and the 21-acylates thereof).

Example 15

6α-fluoro-21-hydroxy-1,4,9(11)-pregnatriene-3,20-dione 21-acetate (XII)

Substituting 6α-fluoro-11β,21-dihydroxy-1,4-pregnadiene-3,20-dione 21-acetate (and other 21-acylates thereof) (XI), obtained according to the procedure of Examples 13A, 13B or 14, for 6α-fluoro-11β,21-dihydroxy-4-pregnene-3,20-dione 21-acetate (II) in the procedure of Example 1 produces crystals of 6α-fluoro-21-hydroxy-1,4,9(11)-pregnatriene-3,20-dione 21-acetate (and other 21-acylates thereof) (XII), which can be hydrolyzed to 6α-fluoro-21-hydroxy-1,4,9(11)-pregnatriene-3,20-dione according to the procedure of Example 1A.

Example 16

6α-fluoro-9α-bromo-11β,21-dihydroxy-1,4-pregnadiene-3,20-dione 21-acetate (XIII)

Substituting 6α-fluoro-21-hydroxy-1,4,9(11)-pregnatriene-3,20-dione 21-acetate (and other 21-acylates thereof) (XII) for 6α-fluoro-21-hydroxy-4,9(11)-pregnadiene-3,20-dione 21-acetate (III) in the procedure of Example 2 produces crystals of 6α-fluoro-9α-bromo-11β,21-dihydroxy-1,4-pregnadiene-3,20-dione 21-acetate (and other 21-acylates thereof) (XIII).

Similarly, substitution of another N-haloamide or an N-haloimide such as N-iodosuccinimide or N-chlorosuccinimide for the N-bromoacetamide in the procedure of Example 2 is productive of the corresponding 9α-iodo or 9α-chloro product, respectively.

In like manner, substituting 6α-fluoro-21-hydroxy-1,4,9(11)-pregnatriene-3,20-dione in the procedure of Example 2 is productive of 6α-fluoro-9α-bromo-11β,21-dihydroxy-1,4-pregnadiene-3,20-dione.

Example 17

6α-fluoro-9β,11β-oxido-21-hydroxy-1,4-pregnadiene-3,20-dione (XIV)

Substituting 6α-fluoro-9α-bromo-11β,21-dihydroxy-1,4-pregnadiene-3,20-dione (and the 21-acylates thereof) (XIII) for 6α-fluoro-9α-bromo-11β,21-dihydroxy-4-pregnene-3,20-dione (IV) in the procedure of Example 3 produces crystals of 6α-fluoro-9β,11β-oxido-21-hydroxy-1,4-pregnadiene-3,20-dione (and the 21-acylates thereof) (XIV).

Similarly, 6α-fluoro-9α-chloro-11β,21-dihydroxy-1,4-pregnadiene-3,20-dione (and the 21-acylates thereof) and the 9α-iodo analogue thereof can be converted to 6α-fluoro-9β,11β-oxido-21-hydroxy-1,4-pregnadiene-3,20-dione (and the 21-acylates thereof).

Example 18

6α,9α-difluoro-11β,21-dihydroxy-1,4-pregnadiene-3,20-dione (VIII)

Substituting 6α-fluoro-9β,11β-oxido-21-hydroxy-1,4-pregnadiene-3,20-dione (and the 21-acylates thereof) (XIV) for 6α-fluoro-9β,11β-oxido-21-hydroxy-4-pregnene-3,20-dione (V) in the procedure of Example 4 produces 6α,9α-difluoro-11β,21-dihydroxy-1,4-pregnadiene-3,20-dione (and the 21-acylates thereof) (VIII).

Substitution of aqueous hydrogen chloride or hydrogen bromide for hydrogen fluoride is productive of the corresponding 9α-halo product.

Example 19

The 6β-epimers

Substituting 6β-fluoro-11β,21-dihydroxy-4-pregnene-3,20-dione 21-acetate (and other 21-acylates) for the starting material in Example 1 and following the procedures of Examples 1 through 18 but maintaining near neutral reaction conditions, there is produced respectively as the product of each example the corresponding 6β-steroid, for example, 6β-fluoro-21-hydroxy-4,9(11)-pregnadiene-3,20-dione 21-acetate (and other 21-acylates and the 21-alcohol thereof) (Examples 1 and 1A), 6β-fluoro-9α-bromo-11β,21-dihydroxy-4-pregnene-3,20-dione 21-acetate (and other 21-acylates and the 21-alcohol thereof) (Example 2), 6β-fluoro-9β,11β-oxido-21-hydroxy-4-pregnene-3,20-dione (and the 21-acylates thereof) (Example 3), 6β,9α-difluoro-11β,21-dihydroxy-4-pregnene-3,20-dione (and the 21-acylates thereof) (Example 4), 6β,9α-difluoro-21-hydroxy-4-pregnene-3,11,20-trione 21-acetate (and other 21-acylates and the 21-alcohol thereof) (Example 5), 6β,9α-difluoro-11β,21-dihydroxy-1,4-pregnadiene-3,20-dione (Examples 6, 11, 18), 6β,9α-difluoro-11β,21-dihydroxy-1,4-pregnadiene-3,20-dione 21-acylates (Examples 6A, 6B, 11, 18), 6β,9α-difluoro-21-hydroxy-1,4-pregnadiene-3,11,20-trione (Examples 8, 10, 12), 6β,9α-difluoro-21-hydroxy-1,4-pregnadiene-3,11,20-trione 21-acylates (Examples 8A, 8B, 10, 12), 6β-fluoro-11β,21-dihydroxy-4-pregnene-3,20-dione (Examples 13, 14), 6β-fluoro-11β,21-dihydroxy-1,4-pregnadiene-3,20-dione 21-acylates (Examples 13A, 13B, 14), 6β-fluoro-21-hydroxy-1,4,9(11)-pregnatriene-3,20-dione 21-acetate (and other 21-acylates and the 21-alcohol thereof) (Example 15), 6β-fluoro-9α-bromo-11β,21-dihydroxy-1,4-pregnadiene-3,20-dione 21-acetate (and other 21-acylates and the 21-alcohol thereof) (Example 16), 6β-fluoro-9β,11β-oxido-21-hydroxy-1,4-pregnadiene-3,20-dione (and the 21-acylates thereof) (Example 17).

Example 20

Isomerization of the 6β-fluoro steroids to the corresponding 6α-fluoro steroids Illustratively, this reaction is carried out as follows:

A solution of one gram of 6β,9α-difluoro-11β,21-dihydroxy-1,4-pregnadiene-3,20-dione in 100 milliliters of chloroform and 0.1 milliliter of alcohol is cooled to approximately minus ten degrees in an ice-salt bath and a stream of anhydrous hydrogen chloride is gently bubbled through the solution for about 2.5 hours whilst maintaining the temperature between approximately minus five and minus fifteen degrees centigrade. The solution is then washed with dilute sodium bicarbonate solution and water, dried over anhydrous sodium sulfate, and evaporated to dryness under reduced pressure. Crystallization of the residue from acetone-Skellysolve B hexanes yields 6α,9α - difluoro-11β,21-dihydroxy-1,4-pregnadiene-3,20-dione (VIII), of Example 6.

In a similar manner, other 6β-fluoro steroids, for example, those named in Example 19, such as, for example, 6β-fluoro-21-hydroxy-4,9(11)-pregnadiene-3,20-dione (and the 21-acylates thereof), 6β-fluoro-9α-bromo-11β,21-dihydroxy-4-pregnene-3,20-dione (and the 21-acylates thereof), 6β-fluoro-9β,11β-oxido-21-hydroxy-4-pregnene - 3,20-dione (and the 21-acylates thereof), 6β,9α-difluoro-11β,21-dihydroxy-4-pregnene-3,20-dione (and the 21-acylates thereof), 6β,9α-difluoro-21-hydroxy - 4 - pregnene-3,11,20-trione (and the 21-acylates thereof), 6β,9α-difluoro-11β,21-dihydroxy-1,4-pregnadiene-3,20-dione (and the 21-acylates thereof), 6β,9α-difluoro-21-hydroxy-1,4-pregnadiene-3,11,20-trione (and the 21-acylates thereof), 6β-fluoro-11β,21-dihydroxy-1,4-pregnadiene-3,20-dione (and the 21-acylates thereof), 6β-fluoro-21-hydroxy-1,4,9(11)-pregnatriene-3,20-dione (and the 21-acylates thereof), 6β-fluoro-9α-bromo-11β,21-dihydroxy - 1,4 - pregnadiene-3,20-dione (and the 21-acylates thereof), and 6β-fluoro-9β,11β-oxido-21-hydroxy-1,4-pregnadiene-3,20-dione (and the 21-acylates thereof) can be converted to their corresponding 6α-analogues.

This application is a continuation-in-part of application Serial No. 699,507, filed November 29, 1957.

It is to be understood that the invention is not to be limited to the exact details of operation or exact compounds shown and described, as obvious modifications and equivalents will be apparent to one skilled in the art and the invention is therefore to be limited only by the scope of the appended claims.

We claim:
1. A 6-fluoro-11-oxygenated compound of the following formula:

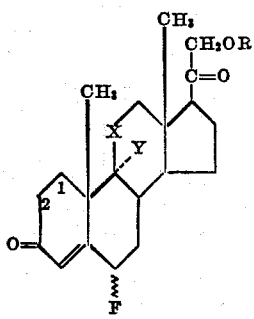

wherein the 1,2-carbon atoms linkage is selected from the group consisting of single and double bond linkages, R is selected from the group consisting of hydrogen and the acyl radical of a hydrocarbon carboxylic acid containing from one to twelve carbon atoms, inclusive, X is selected from the group consisting of the carbonyl radical and the hydroxy-methylene radical, and Y is a halogen having an atomic weight of from nineteen to eighty.

2. 6α,9α - difluoro - 11β,21 - dihydroxy - 4 - pregnene-3,20-dione.

3. 6,9α - difluoro - 11β,21 - dihydroxy - 4 - pregnene-3,20-dione 21-acylates in which the acyl radical is that of a hydrocarbon carboxylic acid containing from one to twelve carbon atoms, inclusive.

4. 6α,9α - difluoro - 11β,21 - dihydroxy - 4 - pregnene-3,20-dione 21-acetate.

5. 6α,9α - difluoro - 11β,21 - dihydroxy - 4 - pregnene-3,20-dione 21-hemisuccinate.

6. 6α,9α - difluoro - 21 - hydroxy - 4 - pregnene - 3,11,20-trione.

7. 6,9α - difluoro - 21 - hydroxy - 4 - pregnene - 3,11,20-trione 21-acylates in which the acyl radical is that of a hydrocarbon carboxylic acid containing from one to twelve carbon atoms, inclusive.

8. 6α,9α - difluoro - 21 - hydroxy - 4 - pregnene - 3,11,20-trione 21-acetate.

9. 6α,9α - difluoro - 21 - hydroxy - 4 - pregnene - 3,11,20-trione 21-hemisuccinate.

10. 6α,9α - difluoro - 11β,21 - dihydroxy - 1,4 - pregnadiene-3,20-dione.

11. 6,9α - difluoro - 11β,21 - dihydroxy - 1,4 - pregnadiene-3,20-dione 21-acylates in which the acyl radical is that of a hydrocarbon carboxylic acid containing from one to twelve carbon atoms, inclusive.

12. 6α,9α - difluoro - 11β,21 - dihydroxy - 1,4 - pregnadiene-3,20-dione 21-acetate.

13. 6α,9α - difluoro - 11β,21 - dihydroxy - 1,4 - pregnadiene-3,20-dione 21-hemisuccinate.

14. 6α,9α - difluoro - 21 - hydroxy - 1,4 - pregnadiene-3,11,20-trione.

15. 6,9α - difluoro - 21 - hydroxy - 1,4 - pregnadiene-3,11,20-trione 21-acylates in which the acyl radical is that of a hydrocarbon carboxylic acid containing from one to twelve carbon atoms, inclusive.

16. 6α,9α - difluoro - 21 - hydroxy - 1,4 - pregnadiene-3,11,20-trione 21-acetate.

17. 6α,9α - difluoro - 21 - hydroxy - 1,4 - pregnadiene-3,11,20-trione 21-hemisuccinate.

18. 6α - fluoro - 9α - bromo - 11β,21 - dihydroxy - 4-pregnene-3,20-dione.

19. 6α - fluoro - 9α - bromo - 11β,21 - dihydroxy - 4-pregnene-3,20-dione 21-acetate.

20. 6α - fluoro - 9α - bromo - 11β,21 - dihydroxy - 1,4-pregnadiene-3,20-dione.

21. 6α - fluoro - 9α - bromo - 11β,21 - dihydroxy - 1,4-pregnadiene-3,20-dione 21-acetate.

22. A 6-fluoro-9β,11β-oxido compound of the following formula:

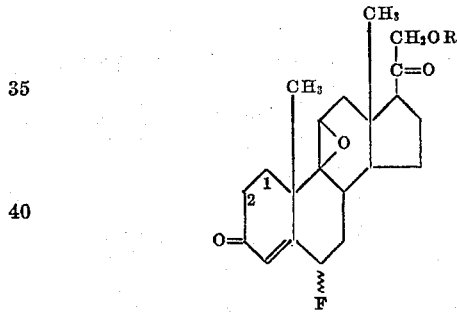

wherein the 1,2-carbon atom linkage is selected from the group consisting of single and double bond linkages, and R is selected from the group consisting of hydrogen and the acyl radical of a hydrocarbon carboxylic acid containing from one to twelve carbon atoms, inclusive.

23. 6α - fluoro - 9β,11β - oxido - 21 - hydroxy - 4-pregnene-3,20-dione.

24. 6α - fluoro - 9β,11β - oxido - 21 - hydroxy - 4-pregnene-3,20-dione 21-acetate.

25. 6α - fluoro - 9β,11β - oxido - 21 - hydroxy - 1,4-pregnadiene-3,20-dione.

26. 6α - fluoro - 9β,11β - oxido - 21 - hydroxy - 1,4-pregnadiene-3,20-dione 21-acetate.

27. A 6-fluoro-9(11)-dehydro compound of the following formula:

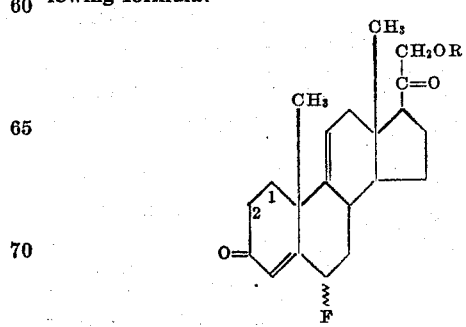

wherein the 1,2-carbon atom linkage is selected from the group consisting of single and double bond linkages, and R is selected from the group consisting of hydrogen and the acyl radical of a hydrocarbon carboxylic acid containing from one to twelve carbon atoms, inclusive.

28. 6α - fluoro - 21 - hydroxy - 4,9(11) - pregnadiene-3,20-dione.

29. 6α - fluoro - 21 - hydroxy - 4,9(11) - pregnadiene-3,20-dione 21-acetate.

30. 6α - fluoro - 21 - hydroxy - 1,4,9(11) - pregnatriene-3-20-dione.

31. 6α - fluoro - 21 - hydroxy - 1,4,9(11) - pregnatriene-3,20-dione 21-acetate.

No references cited.